(12) United States Patent
Petersen

(10) Patent No.: US 7,631,681 B1
(45) Date of Patent: Dec. 15, 2009

(54) TIRE-RIM SEPARATION DEVICE

(76) Inventor: David Petersen, 6908 220th St. SW., Mountlake Terrace, WA (US) 98043

( * ) Notice: Subject to any disclaimer, the term of this patent is extended or adjusted under 35 U.S.C. 154(b) by 0 days.

(21) Appl. No.: 11/876,159

(22) Filed: Oct. 22, 2007

Related U.S. Application Data

(60) Provisional application No. 60/889,710, filed on Feb. 13, 2007.

(51) Int. Cl.
    *B60C 25/132* (2006.01)
(52) U.S. Cl. .................................. 157/1.17; 157/1.26
(58) Field of Classification Search ............... 157/1.17, 157/1.1, 1.26, 1.3, 1.33, 1.39
    See application file for complete search history.

(56) References Cited

U.S. PATENT DOCUMENTS

| | | | |
|---|---|---|---|
| 1,495,884 A * | 5/1924 | Chapman | ................... 157/1.26 |
| 2,474,926 A | 7/1949 | York | |
| 2,656,882 A | 10/1953 | Rodgers | |
| 2,672,184 A | 3/1954 | Bergeron | |
| 2,672,185 A | 3/1954 | Bergeron | |
| 2,760,563 A | 8/1956 | Bishman | |
| 3,237,676 A * | 3/1966 | Wise | .......................... 157/1.26 |
| 4,079,769 A * | 3/1978 | Sept, Sr. | ..................... 157/1.26 |
| 4,159,030 A | 6/1979 | Molen et al. | |
| 4,360,052 A * | 11/1982 | Norris | ......................... 157/1.3 |
| 4,676,291 A | 6/1987 | Bolger | |
| 4,995,439 A * | 2/1991 | Burge | ......................... 157/1.17 |
| 5,232,035 A * | 8/1993 | Adams, Jr. | ................. 157/1.17 |
| 5,482,594 A | 1/1996 | Salminen | |
| 5,555,922 A | 9/1996 | Brunner | |
| 6,276,423 B1 | 8/2001 | Goracy | |
| 6,574,843 B1 * | 6/2003 | Meadows | ................... 29/33 N |
| 6,786,267 B1 | 9/2004 | Warren | |
| 2004/0129388 A1 * | 7/2004 | Brazil | ........................ 157/1.3 |

* cited by examiner

*Primary Examiner*—Hadi Shakeri
(74) *Attorney, Agent, or Firm*—Michael F. Hughes; Hughes Law Firm, PLLC

(57) ABSTRACT

A portable tire bead breaker comprising a plurality of elements which can be disassembled to form a compact kit. Includes a base over which a tire and rim may be placed, a support member, and a lever arm. Also included is a plunger member configured to engage the tire and break the bead thereon. To break a tire bead, the elements are assembled and a force is extended upon the lever arm, engaging the plunger member upon the tire and creating sufficient force against the tire in opposition to the rim to disassociate therefrom. The tire bead breaker can be disassembled into a compact unit for storage and transportation.

7 Claims, 9 Drawing Sheets

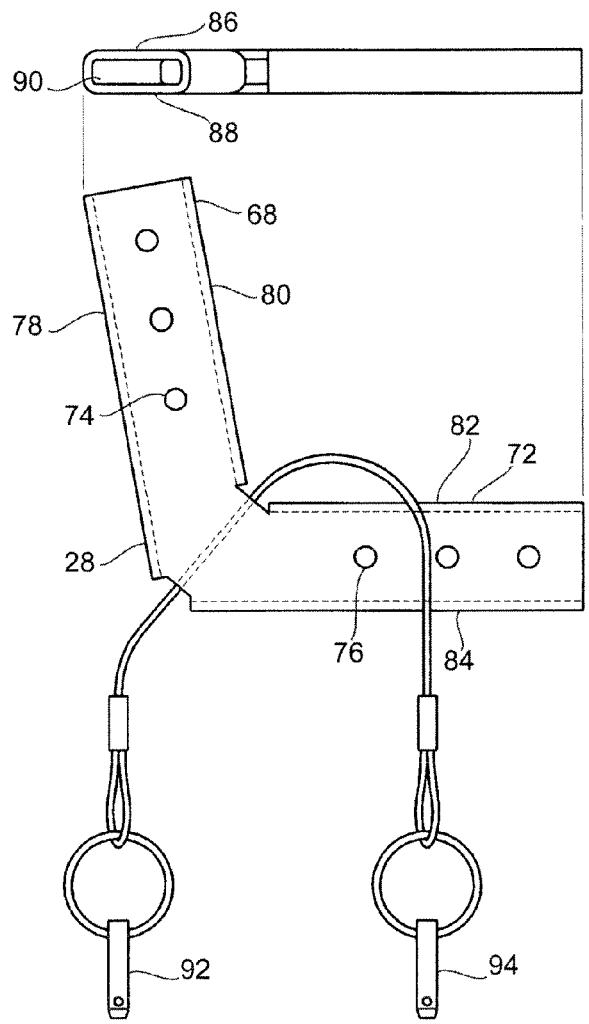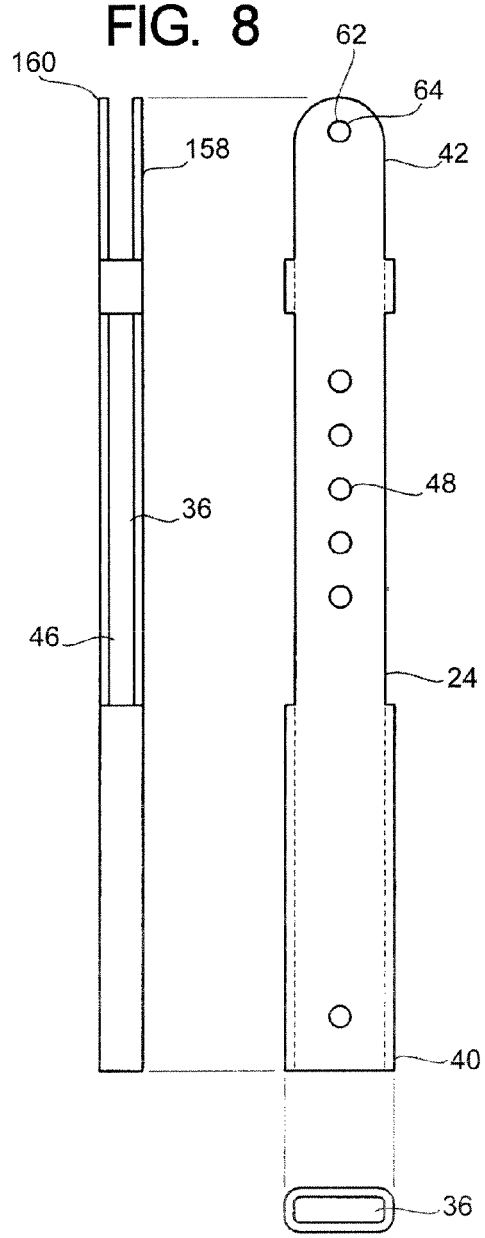

TIRE-RIM SEPARATION DEVICE

RELATED APPLICATIONS

This application claims priority benefit of U.S. Ser. No. 60/889,710, filed Feb. 13, 2007.

BACKGROUND OF THE DISCLOSURE

Motorcycle tire and wheel assemblies are generally constructed of steel or alloy rim with a latticework of spokes that attach the rim to the hub. They may also be constructed of a cast alloy hub/rim assembly with open cutaway spaces between the rim and hub. Either type of wheel assembly would applicable to this invention.

Acceleration and deceleration of the motorcycle or other vehicle tends to cause the tire to rotate on the rim. Rotation of the tire on the rim is not desirable because it can cause the wheel assembly to become unbalanced. In the case of tubed tires (an inner air-filled bladder within the tire carcass) any rotation of the tire can cause the tube's valve stem to tear away from the main tube bladder, leading to a sudden and catastrophic loss of air pressure. In the case of tubeless tires (no inner air bladder) rotation of the tire on the rim can cause a gradual loss of air pressure, with an eventual loss of bead-to-rim contact, and potential catastrophic loss of air pressure.

When a rubber motorcycle tire is mounted to the metal hub/spoke/rim assembly, it is held in place with a combination of air pressure, tension of the rubber tire itself which exerts an outward (sideways) force, and friction between the rubber tire sidewall and the metal rim. Often the motorcycle manufacturer or tire installer uses special lubricant/adhesive solution that literally "glues" the rubber tire in place on the rim. Even without this solution the rubber tends to "fuse" itself to the rim over time and tire removal can become very difficult.

Additionally, motorcycle tires are often mounted on what's called "safety rims" or "locking rims". The design of these rims is such that the tire's sidewall and annular bead is retained in such as manner as to prevent movement of the tire within the rim, when subjected to the high stresses involved in turning or cornering maneuvers. The design of these rims makes tire removal nearly impossible without specialty tools.

When it's time to change a motorcycle tire due to road wear or to make a repair of the tube or otherwise perform any repairs on the tire, it is necessary to "break the bead". This is a commonly used term that refers to the process of breaking the adhesive and/or mechanical seal between the rubber sidewall of the tire, and the rim itself. Due to the design of modern tires, which are physically wider than the rim itself, and because of the widespread use of lubricant/adhesives holding the tire in place on the rim, this process can be extremely difficult (if not impossible) unless you have proper tools.

The process of changing or repairing a tire on an automobile is considered relatively easy because nearly every car has a spare tire, and when a flat tire has been removed from the automobile almost every service station has the necessary professional equipment and training to fix or replace an automotive tire.

However, the process of changing or repairing a motorcycle tire is a different story because most motorcycles can't carry spare tires. Motorcycle shops are few and far between so whenever a motorcycle has a flat tire the rider is often forced to make roadside repairs using whatever tools he/she might carry with them. The alternative is to call for a towing service and have the motorcycle hauled to the dealership for repair.

For those who attempt to repair motorcycle tires or for those who change their own tires when the tires become worn, the first step in the process is to deflate the tire (in the case of a flat tire this has already occurred). The second step is to remove the tire and wheel assembly from the motorcycle. The third step is to "break the bead" or otherwise break the seal between the rubber tire and the metal rim. Finally the tire can be removed from the rim and repaired or replaced.

Currently there are very few (if any) tools compact enough, lightweight enough, or otherwise suitable for this process. Motorcyclists have responded to this lack of suitable tools by concocting a variety of expedient devices, including C-clamps (or modifications thereof), or wedges driven between the tire and rim using a hammer or mallet, or some sort of pure brute force method, including jumping up and down on the side of the rubber tire (while trying to avoid jumping on the rim itself).

One popular technique is to use a second motorcycle's side stand as a tool to wedge between the tire and rim, while rocking the second motorcycle so that its' weight presses down on the side stand and hopefully breaks the bead. This method may work but often results in damage to the side stand, as well as damaging the rim. Whatever method is used the process is difficult and sometimes dangerous. It may be necessary to exert a force of more than 500 pounds to break the seal between the metal rim and tire. As rubber tires get older this bead breaking process becomes even more difficult because the rubber compounds become stiffer and less pliable. Also, as ambient temperatures drop the process becomes increasingly difficult.

This embodiment utilizes a simple fulcrum and lever device that compounds the user's downward weight, thereby forcing a wedge-shaped plunger member into the space between the rim and wheel. With sufficient extension of the lever the force exerted can easily exceed 1000 pounds, which has proven to be more than enough force to unseat a motorcycle tire bead from a rim.

This embodiment can be used in any location having a flat, relatively hard work surface. The tire assembly must first be removed from the motorcycle and placed in a horizontal position; in other words, the wheel assembly must be resting flat on the ground.

This embodiment can also be used in any location having a flat, soft surface such as sandy soil or bare earth. This can be accomplished by the addition of wooden or metal strips fixed at perpendicular angles to the device, placed so as to widen the "footprint" of the device and prevent it from sinking in the soil when downward pressure is applied to the embodiment or to the tire assembly.

Although the working model of this embodiment is sized as shown in the drawings, production models could be constructed to any scale, depending on the need of the user or the size of the wheel assembly.

Once the motorcycle operator has successfully "broken the bead" on the tire, they must then make repairs to the tire. This requires removing the pneumatic tire from the metal rim. This is done with a set of two or three metal "tire irons", which are essentially flattened pry bars.

Tire irons can be of varying size and shape, but for practical purposes and ease of carry on a motorcycle they should be as compact and lightweight as possible. The typical tire iron used for this embodiment is about 0.25" thick, 0.75" wide, and about 8" to 10" long. Each end of the tire iron is shaped and designed to make tire removal process as easy as possible, and smooth to prevent damage to the tire carcass or the inner tube.

To remove a tire from a metal rim the user places a tire iron between the metal rim and the pneumatic tire and using the leverage provided by the tire iron forces the circumferential inner bead of the tire over the edge of the rim. The user repeats this process around the tire assembly until one side of the tire comes off the rim. The user then repeats the process on the remaining tire sidewall until the tire has been completely separated from the rim. At that point the tire can be repaired, replaced, or the inner tube can be repaired or replaced.

To install a tire on a metal rim the user places a tire iron between the metal rim and pneumatic tire and forces the tire bead over the edge of the rim, then repeats the process around the tire until the tire is on the rim. The user repeats the process on the other sidewall of the tire until the tire is fully onto the rim, at which time the tire is filled with air. In the case of a tubed tire the tube is inserted into the tire before the second sidewall is forced onto the rim.

SUMMARY OF THE DISCLOSURE

What is disclosed herein is a tool called a bead breaker for breaking a circumferential bead of a motorcycle tire from an associated rim comprising a plurality of parts. A group of tire irons, which are similar to those already known in the art, but in general will be described as a leveraged tire iron, a support tire iron, and the base tire iron. The tire irons are configured to couple either to extend the driving force of a user against the tire for separating a tire from a rim or alternatively to support said driving member in a vertical or horizontal orientation. The driving member comprises a channel-like apparatus which has a hole in one end for locating a pivot pin and a channel disposed in the opposite end for inserting one of the previously mentioned tire irons to extend the driving force. The central portion of the driving member is configured to accept a plunger member which directly couples to the tire. This connection between the driving member and the plunger member could be adjustable in its X&Y directions and should in one form be a pivotal connection. The plunger member is configured to pivot about the middle portion of the driving member and may have on one end a specifically designed tire engagement portion. An angle portion herein discussed as a base elbow is also disclosed wherein a first end of the base elbow is configured to fixedly and position-ably engage a support tire iron which forms the base portion of the apparatus when in use. The base elbow has a portion of which is generally an angle bracket and a second end which is configured to fixedly and positionably engage the end portion of the support tire iron. The support tire iron is substantially vertical in orientation to the ground when in use and having on its opposite end a pivotal engagement with the driving member.

When in use, the bead breaker will exert tremendous force upon the sidewall of the tire and may thus exert force upon the rim or wheel portion. As the assembly is substantially made from metallic parts, a plurality of scratch guards may be formed to temporarily and removably couple to and protect the base elbow from scratching the wheel.

One of the easiest ways to assemble the apparatus in one form is to utilize quick release pins which are common in the art. As these quick release pins are often very small, they may be connected by way of a lanyard which may be a bright color or otherwise aid in maintaining the quick release pins from being lost or misplaced.

As previously stated the bead breaker in operation may exert significant force against the tire portion and some of this force may be directed outward which will tend to slide the wheel and tire away from the base elbow and the vertical support tire iron. Thus, a lock bar which is slideably engaged with the base tire iron. As tires and wheels come in a wide variety of diameters and sizes it may be desirable that this lock bar be positionable along the length of the base tire iron.

As shown in the accompanying figures, it is possible to construct this apparatus using a plurality of tire irons which are each identical to one another. This would aid in construction and would also aid in manufacture and assembly.

Often it is desired to form a stable support base for this apparatus. For example, it may be necessary to remove a tire from a wheel where the only hard or flat surface available is soft such as sand or loose dirt. Thus, a base member is also disclosed which forms a larger and wider support structure for the assembly.

Recent advances in chemicals have created fluids which aid the removal of tires from rims. Once the bead has been broken between a tire and a wheel, application of this fluid may maintain the separation and keep the tire from re-adhering to the rim.

If the tire is not wholly damaged, it may be desired to remove the remainder of the air pressure from within the tire to aid in its removal. Thus a valve stem multi-tool may also be included which has a plurality of devices applicable to releasing the air from a tire or inner tube. The multi-tool may also be configured to aid in the replacement of a valve stem.

Once the bead has been broken, the tire irons are utilized to lever the tire around the rim. This may damage the rim which is obviously undesired. Thus, the plurality of rim protectors are also disclosed which are configured to temporarily and removably couple to the interior diameter of the rim. In one form all of these elements fit within a very small transportable container such as a bag. As motorcycle saddlebags are very small, space within them is at a premium so the smaller a kit may be preferred.

BRIEF DESCRIPTION OF THE DRAWINGS

FIG. 7 is a detailed view of the base elbow;

FIG. 8 is a detailed view of the driving member;

DESCRIPTION OF THE PREFERRED EMBODIMENTS

Figure 2:
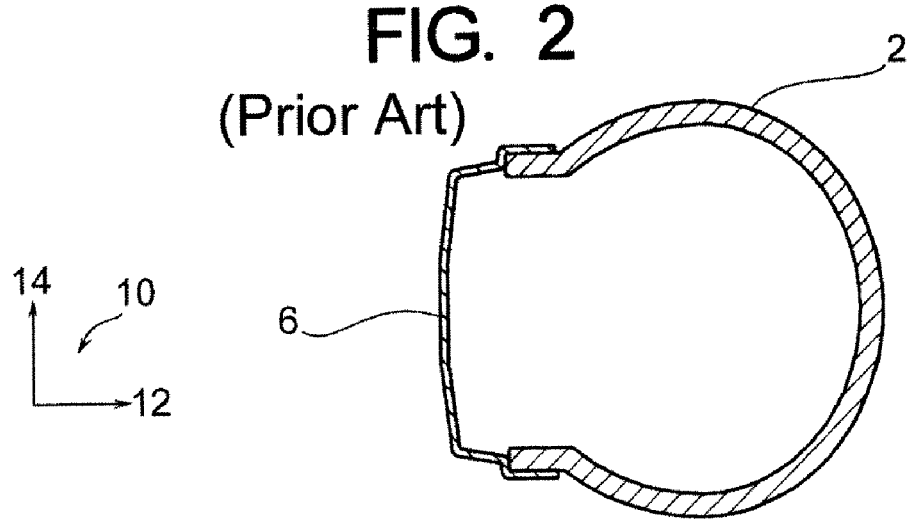
FIG. 2 is a cross-sectional view of a tire and wheel as taken along line 2 of FIG. 1.

To aid in the discussion of this disclosure, an axis system 10 is disclosed wherein the radially outward direction 12 defines that direction from the center of the wheel apparatus towards the tire 3 perimeter. FIG. 2 shows the axis system 10 including a vertical direction 14. Each of these is applicable to a tire assembly lying flat on its side, as it would be configured to operate on the tire or to remove the tire from the rim.

Figure 1:
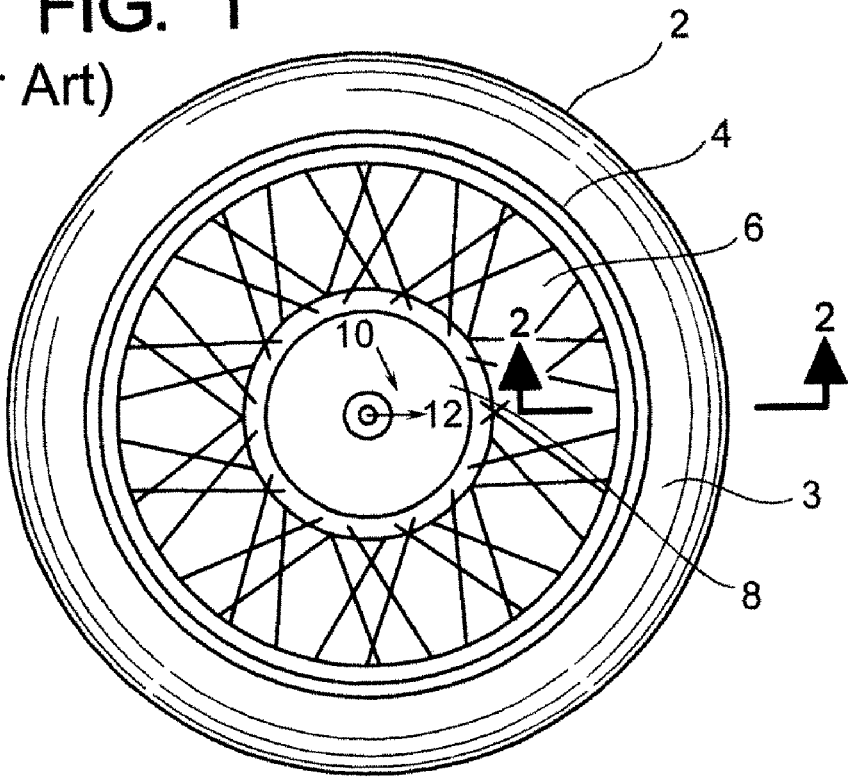
FIG. 1 is a view of a tire and wheel combination.

To further aid in the understanding of the disclosure, a prior art example of a motorcycle wheel assembly is disclosed comprising a tire 3 often made of rubber, a rim 4 often made of metal and often comprising spokes. The wheel 6 comprises the hub 8 or center portion of the assembly and the rim 4. The hub 8 and a rim 4 are often connected by spokes but may also be coupled by unitary structure. FIG. 2 is a prior art example of a tire 3 and wheel 6 taken along line 2 of FIG. 1.

Figure 3:
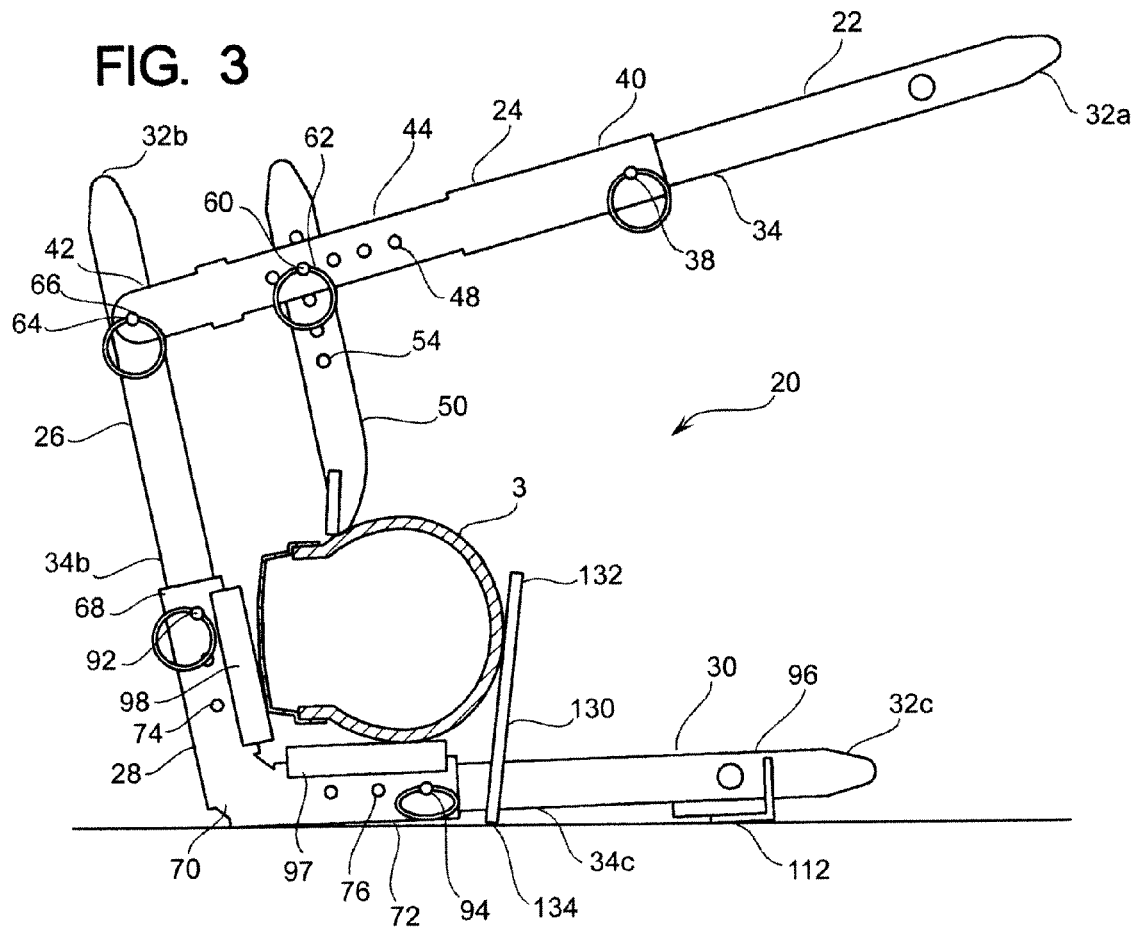
FIG. 3 is a side view of the assembly.
Figure 6:
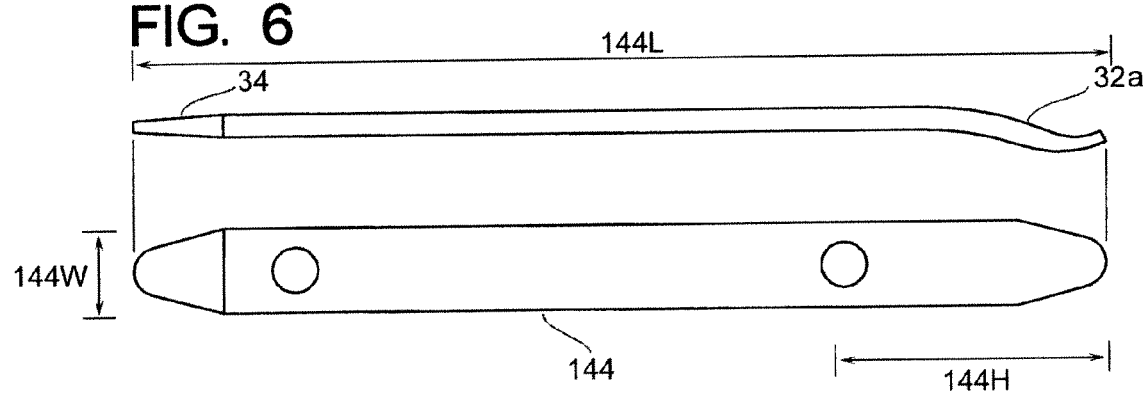
FIG. 6 is a detailed view of a tire iron.
Figure 9:
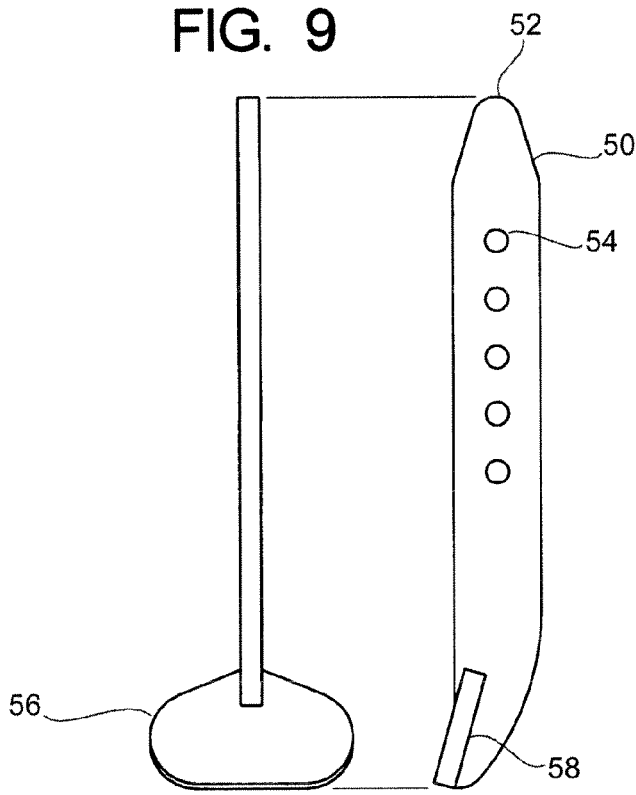
FIG. 9 is a detailed view of the plunger member.

In general, the assembly 20 as first shown in FIG. 3 comprises a plurality of elements: a leverage tire iron 22, a driving member 24, a support tire iron 26, a base elbow 28, and a base tire iron 30. The leveraged tire iron 22 has a first end 32a and a second end 34 as shown in FIG. 6. The second end 34 is adaptively configured to fit within a portion of the driving member 24. This is accomplished by way of a channel 36 being disposed in the driving member 24 as shown in FIG. 8. The leveraged tire iron 22 is maintained within the channel 36 of the driving member 24 by way of a pin 38. In one form, the assembly 20 utilizes as many as five of these pins 38. For ease of construction and assembly, each of the pins 38 may be made identically. To continue the discourse on the assembly 20, the driving member 24 has a first end 40 configured to interoperate with the leveraged tire iron 22 and a second end 42. The driving number 24 furthermore has a middle region 44. The middle region 44 has a channel 36 including an open region 46 further comprising a plurality of holes 48. This channel 36 is configured to accept a plunger 50. As shown in FIG. 9, the plunger 50 comprises a first end 52, a plurality of holes 54, and a tab 56. The tab 56 may be formed as a unitary structure with the plunger 50, or may be attached by other means such as a weld 58. The holes 54 in the plunger member 50 are configured to accept with a pin 60 which is furthermore fit within with the holes 48 of the driving number 24. This particular assembly allows the plunger 52 to rotate about a pivot point 62 comprised of the pin 60 and the holes 48 and 54. The plunger 50 is configured such that it may also be used as a fourth tire iron by virtue of the design of end 52. The particular advantages of this assembly will be discussed later.

The support tire iron 26 as detailed in FIG. 6 comprises a first end 32b, and a second end 34b. The support tire iron 26 further comprises a pivot point 64 being a hole similar to those previously discussed. A pin 66 is disposed through a hole in the second end 42 of the driving member 24 and a hole near the first end 32b of the support tire iron 26 forming the pivot point 64. This allows the driving member 24 to rotate substantially about the support tire iron 26. The advantages therewith will be discussed later.

The assembly 20 furthermore comprises a base elbow 28 which has a first end 68, an angle region 70, and a second end 72. Furthermore the base elbow 28 comprises a plurality of holes 74. There are also holes 76 disposed in the second end 72 of the base elbow 28. The base elbow 28 is further detailed in FIG. 7. The base elbow 28 further comprises a back surface 78 and a front surface 80. Furthermore a top surface 82 and a bottom surface 84 are disposed between the first side 86 and a second side 88 of the base elbow 28. These surfaces of the base elbow 28 comprise a channel 90. This channel 90 is configured to accept a plurality of tire irons. The support tire iron 26 is configured to be slideably positioned within the first end 68 of the base elbow 28. In this embodiment it is held in position by the first side 86, the second side 88, the front surface 80, and the back surface 78. A plurality of holes 74 are disposed in the first side 86 and second side 88. As seen in FIG. 3, a pin 92 is placed through these holes and holds the support tire iron 26 in place. As a plurality of holes 74 are disposed in the base elbow 28, the vertical position of the support tire 26 can be adjusted which furthermore adjusts the vertical position of the driving member 24, increasing the distance between the tab 56 of the plunger 50 and the second end 72 of the base elbow. This is very useful when tires of varying widths are used by the apparatus. Having a wide range of applicability is very useful as not all tires are the same. A pin 94 is configured to interoperate with the hole 76 of the second end 72 of the base elbow 28. This operates similarly to the above-mentioned pin 92 configuration however the second end 72 of the base elbow 28 is configured to interoperate with the base tire iron 96.

Figure 12:
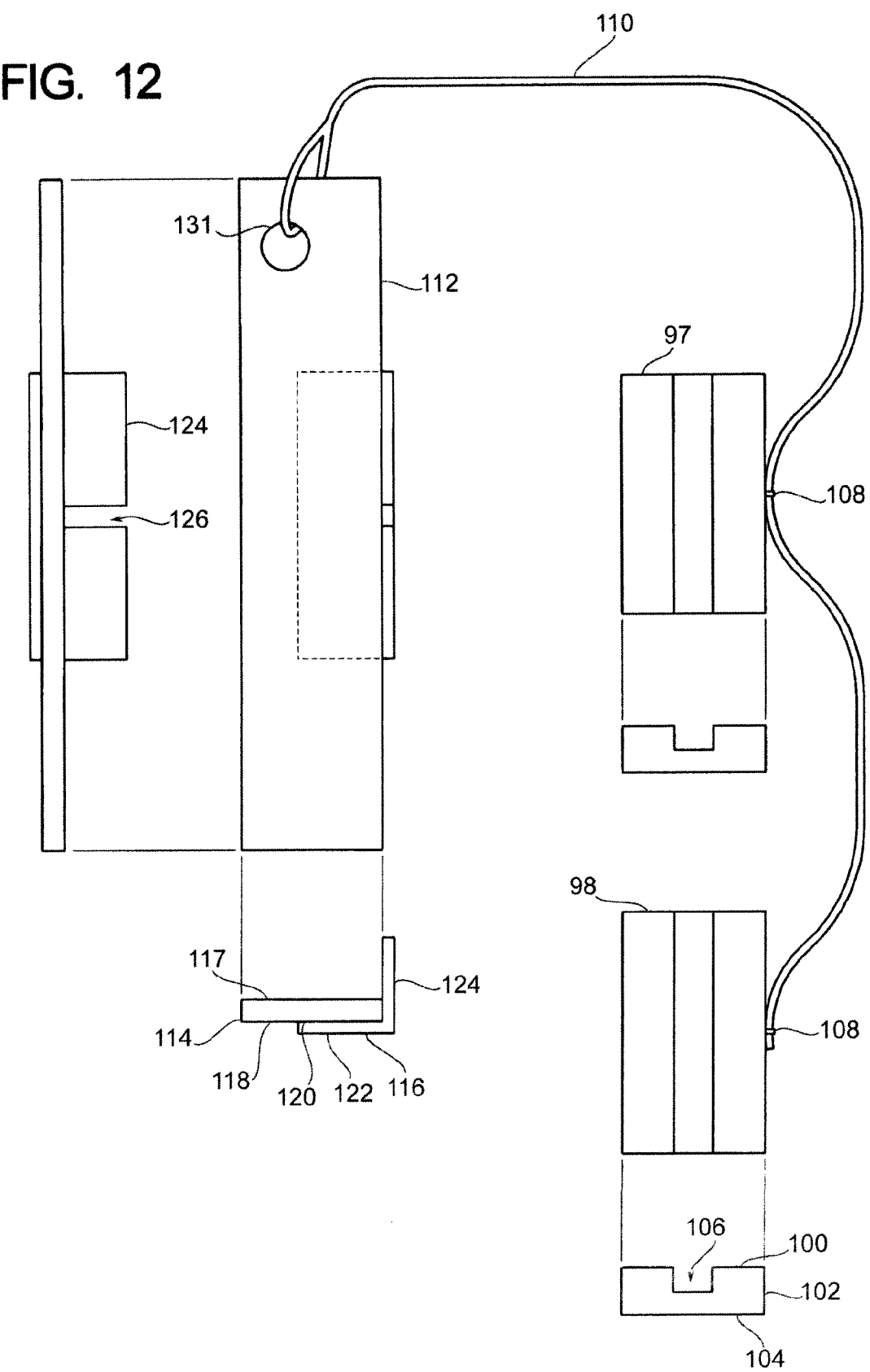
FIG. 12 is a detailed view of the foot and scratch guards connected by a lanyard.
Figure 13:
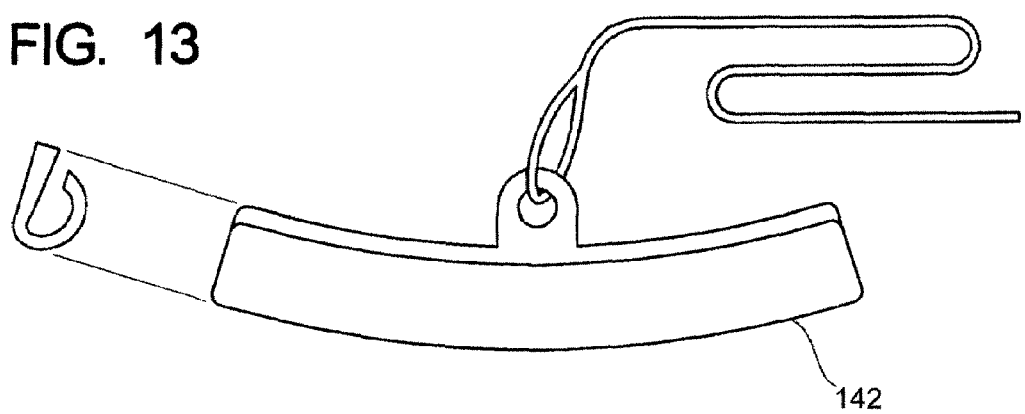
FIG. 13 is a detailed view of the rim protectors.

To protect the apparatus and the interior portion of the wheel 6 a plurality of scratch guards 97 and 98 are disclosed. These are shown first in FIG. 3, and detailed in FIG. 12. The scratch guards 97 and 96 comprise a top surface 100, a body 102 and a bottom surface 104. A dado or channel 106 is disposed in the top surface 100 and configured to interoperate with the base elbow 28. These scratch guards 97 and 98 may be formed of a malleable material such as plywood or polymer such that they will absorb impact and abrasion between the wheels 6 and the base elbow 28. The rubber bands which can also be supplied with the kit can be wrapped around the base elbow and the scratch guards 97 to maintain their position upon the base elbow 28. As shown, the scratch guards 97 and 98 may further comprise a plurality of staples 108 which are configured to couple to a lanyard 110. In one form, the lanyard 110 is configured to couple to a foot 112.

Figure 4:
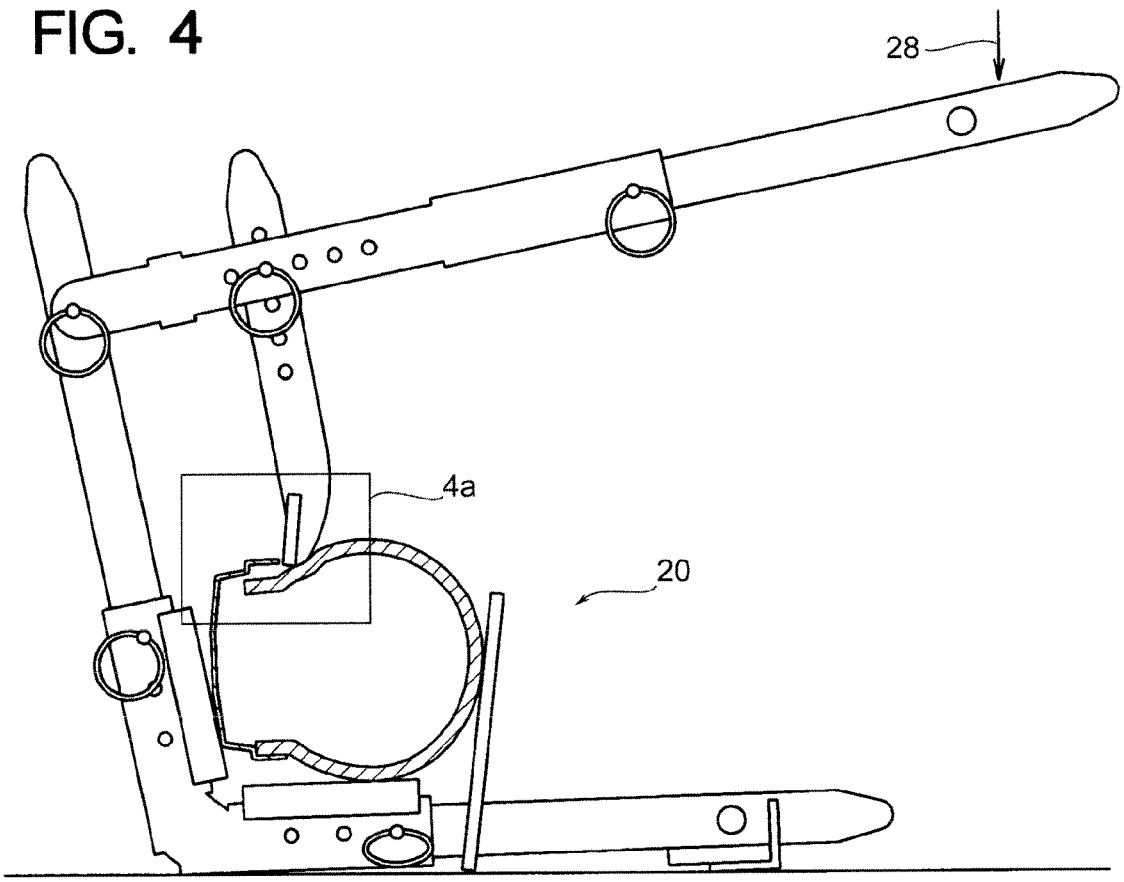
FIG. 4 is a side view of the assembly and operation.

The foot 112 has a base 114 and an angle portion 116. The base 114 further comprises a top surface 117 and a bottom surface 118. The bottom surface 118 is configured to interoperate with the top surface 120 of the angle portion 116. The top surface 120 is disposed on the horizontal portion 122 of the angle portion 116. The angle portion 116 furthermore has a vertical portion 124 which in form has a channel 126 disposed therein and configured to interoperate with the base tire iron 96. This foot 112 operates for two advantages, the first being that it prohibits the assembly 20 from rotating about base elbow 28 when it is in its upright position as shown in FIGS. 3 and 4. The foot 112 has the added advantage of providing a wider base for the assembly 20 such that when forces applied to the leverage tire iron 22 at force vector 28 of FIG. 4, the foot 112 resists any motion in the downward direction which would tend to push it into the ground if the ground is not of sufficient rigidity to support the assembly 20 without the foot 112. For example by putting significant force on the leverage tire iron 22 when the assembly 20 is set on a sandy ground level, the assembly would tend to dig into the ground and be difficult to use. The lanyard 110 which in one form connects the scratch guards 97 and 98 to the foot 112 may be so configured to attach via a hole 131 disposed in one end of the foot 112.

Figure 10:
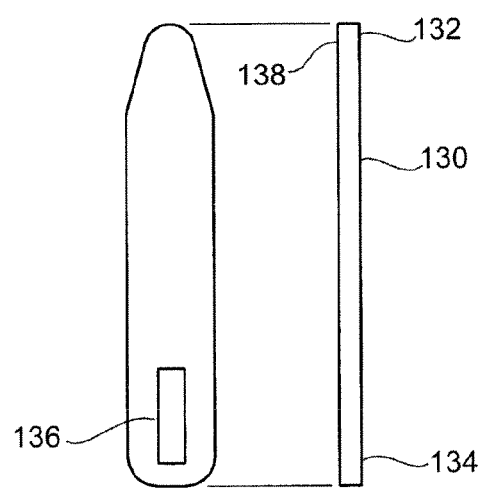
FIG. 10 is a detailed view of the lock bar.
Figure 11:
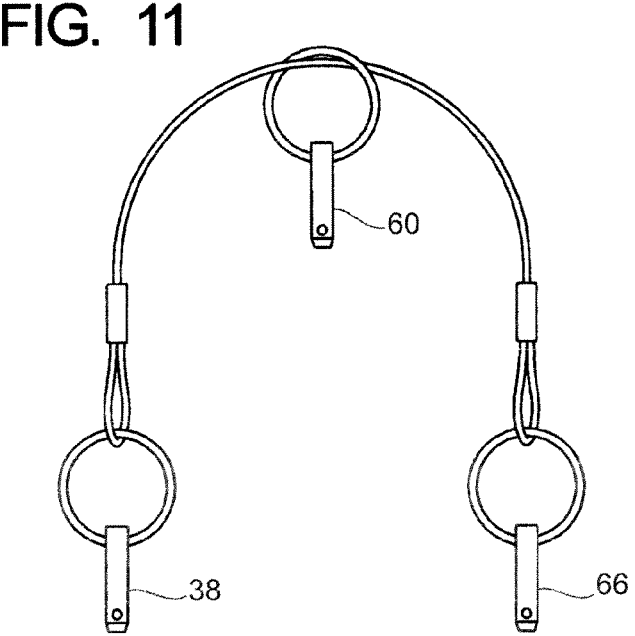
FIG. 11 is a detailed view of a plurality of release pins and connecting lanyard.

A stop member 130 comprising a first end 132 and a second end 134 is configured to interoperate with the base tire iron 96. This is shown in FIGS. 3 and 4, and detailed in FIG. 10. The stop member 130 further comprises a slot 136 configured to accept the base tire iron 96 and be of sufficient size to allow the stop member 130 to slide substantially along the base tire iron 96. The stop member 130 further comprises a front surface 138 which is configured to interoperate with the tire 3. This can easily be seen in FIG. 3 wherein the stop member 130 is configured along the base tire iron 96 and is in contact with the tire 3. In this position the stop member 130 maintains the position of the tire 3 and wheels 6 in relation to the apparatus 20 when force is applied along force vector 28 to the leverage tire iron 22. Enabling the stop member 130 to be positioned along the base tire iron 96 allows for a wide range of tire sizes. The stop member 130 may also be utilized as a 5th tire iron by virtue of it's size and design as the end 132 is similar to the profile of an end of the tire iron 144.

Figure 14:
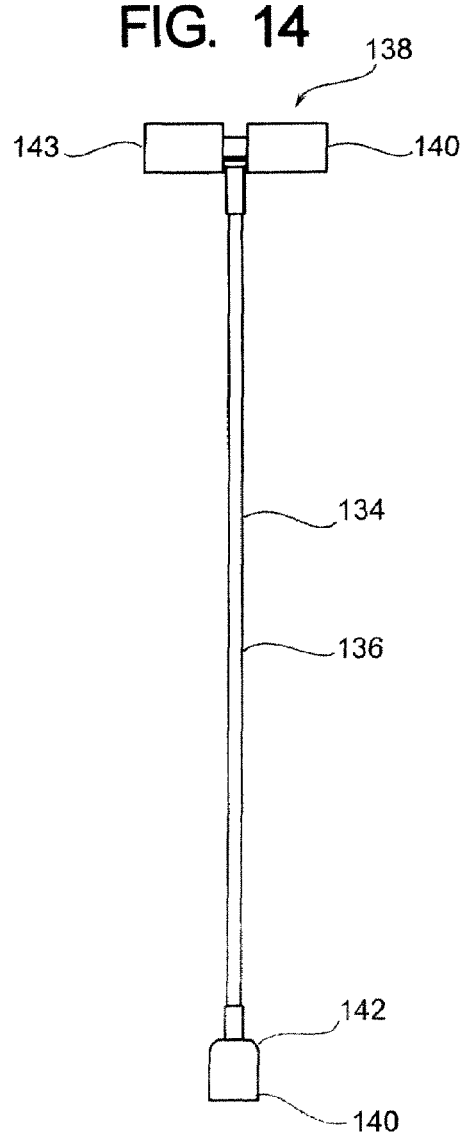
FIG. 14 is a detailed view of the valve stem multi-tool.
Figure 16:
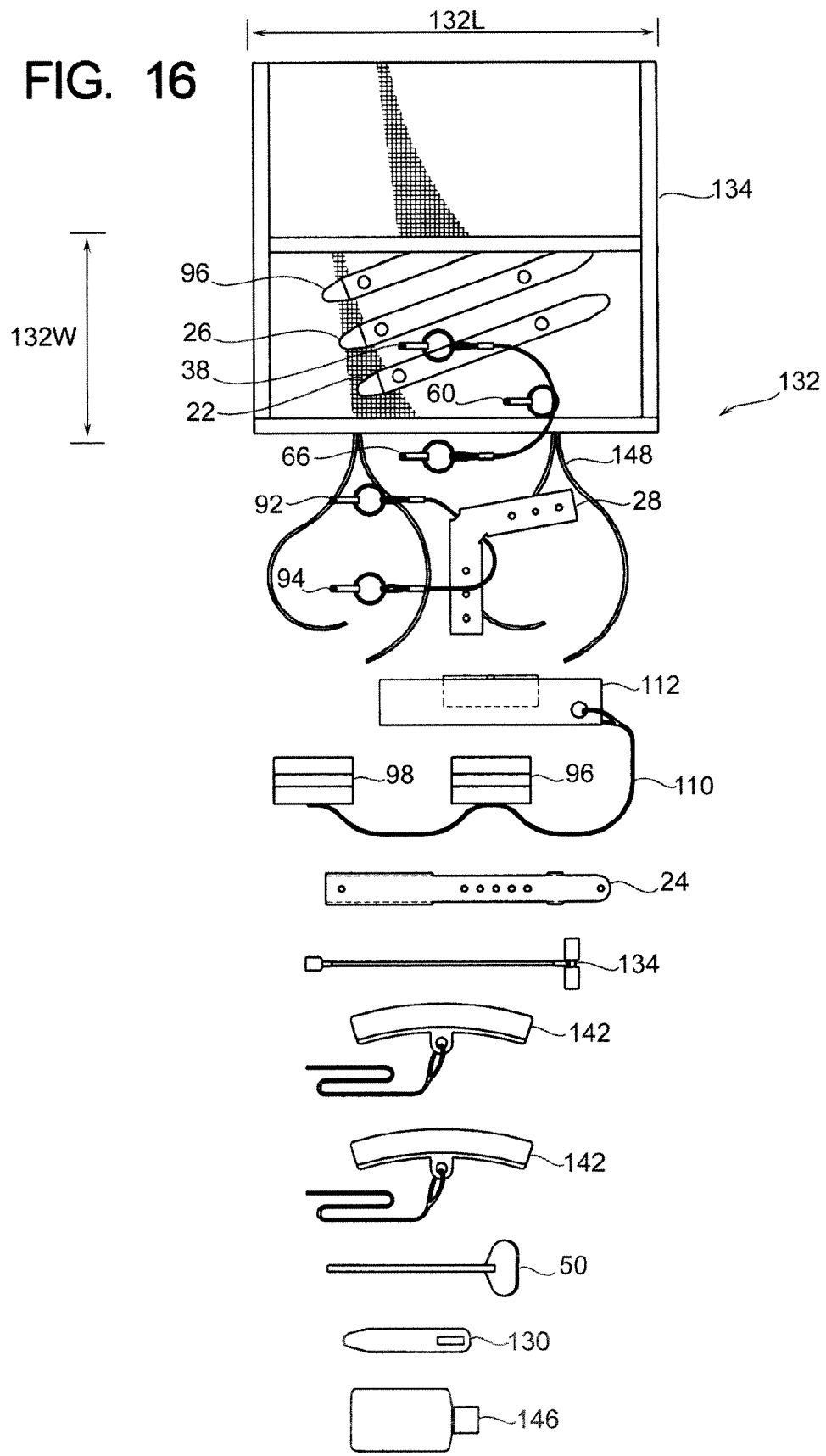
FIG. 16 is an exploded view of the kit containing the entire apparatus in its component parts for storage or transportation.

To make the entire assembly and associated elements easy to carry, a kit 132 is disclosed comprising the elements previously discussed and furthermore including a bag 135 configured to hold all of the items when they are in their disassembled state. This is shown in FIG. 16. Furthermore a multi-tool 134 as detailed in FIG. 14 may be included comprising a connective region 136 coupling on a first end 138 an air deflating head 140 and a valve core removal head 143. On the second end of the multi-tool 134 is a valve stem puller head 143. The deflating head 140 is used to deflate the tire in that it contains a core portion engaged to interoperate with a valve stem on a traditional tire and operates to release the pressure therein. The core removal head 143 is configured to move the valve portion from the valve stem of the tire for ease in removing the tire 3 from the rim 4 or alternatively to replace it if it becomes defective. The stem-puller head is provided to help a user pull a new valve stem into position on a wheel.

Figure 5:
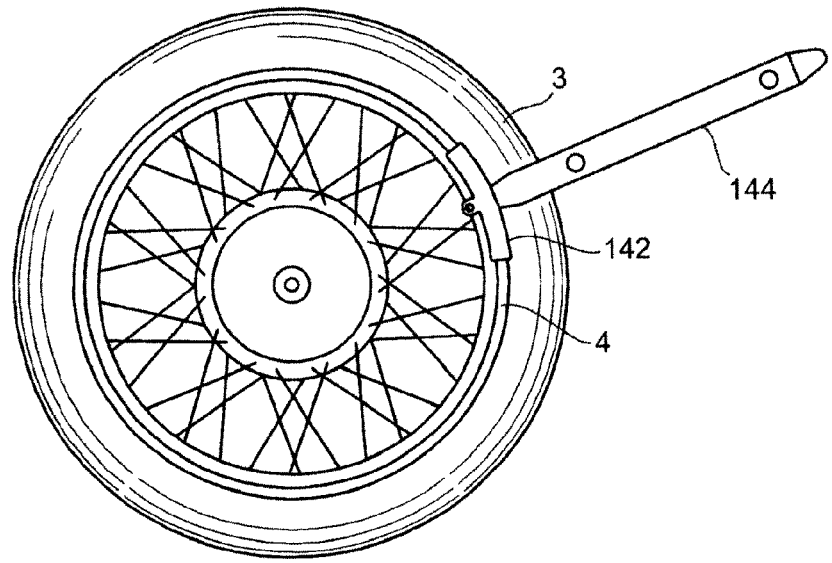
FIG. 5 is a view of the tire and wheel assembly with components in place to remove the tire from the wheel.

Additionally a plurality of rim protectors 142 are disclosed which are configured to be positioned on the rim 4 to protect the rim 4 from damage when the tire 3 is removed from the rim 4 after the bead has been broken. As shown in FIG. 5, the rim protector 142 is placed between the tire iron 144 and the rim 4. The tire iron can then be rotated about the rim protector 142 removing the tire 3 from the rim 4 in at least one position, the tire iron 144 is then rotated about the rim 4 as common in the art and the tire is removed from the rim.

The kit 132 may also comprise a chemical 146 which aids in keeping the tire from re-adhering to the rim after the bead has been broken. One such chemical is Bead Goop™. These chemicals 146 are common in the art and therefore will not be discussed further in this disclosure.

In one form, the kit 132 comprising all the elements previously discussed may be contained within a bag 135. This bag 135 may optionally be tied shut using strings 148 and thus provide a compact kit which can easily be fit in to storage such as the saddle bags of a motorcycle. In one form the entire apparatus when the bag is tied shut takes up a space of approximately twelve inches in length, six inches in width, and three inches in height. Instructions may be provided within, or printed upon the bag or any tool element. Of course the size of the apparatus depends entirely upon the tools contained within.

Figure 4A:
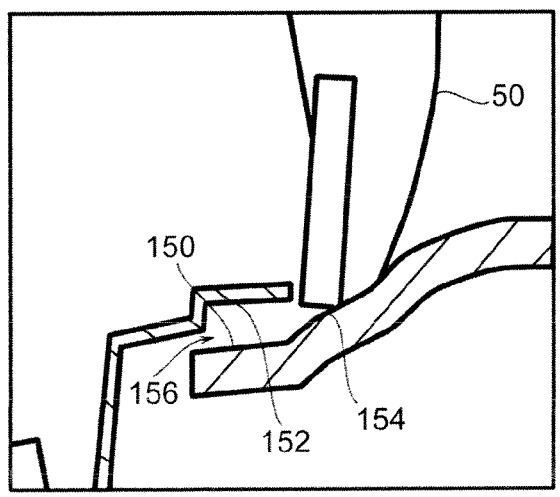
FIG. 4A is a detailed view of FIG. 4.
Figure 15:
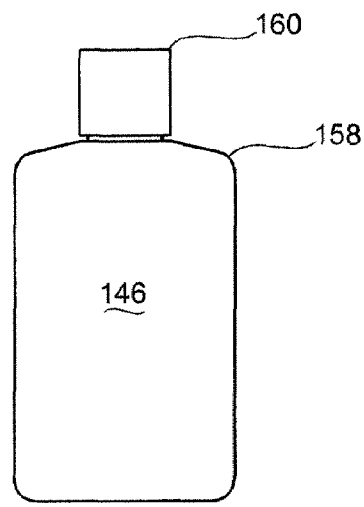
FIG. 15 is a view of a bottle for containment of releasing chemicals.

To describe how the apparatus is used, it must be understood that oftentimes, the radially inward annular region of the tire 150 as detailed in FIG. 4A is in tight or even adhesive engagement with the inward annular region of the rim 152. Therefore, a focused amount of force is required at point 154 by the plunger 50 to "break the bead" on a pneumatic motorcycle tire assembly. This forms a gap 156 between the inward annular region of the tire 150 and the inward annular region of the rim 152. Once this is accomplished, it is a simple matter to either reposition the assembly 20 to a new position and further increase the gap 156, or as known in the art you may "walk the rim" for any person literally stands upon the tire portion and breaks the bead around the tire and wheel assembly. It may be advantageous to use the chemical 146 to assist in breaking the bead. As shown in FIG. 15 a chemical is disclosed being contained within a bottle 158 having an optional flip top 160. This first step of "breaking the bead" is often times the most difficult part of this process and therefore the assembly as disclosed is of great benefit to those wishing to repair their motorcycles in the field. Referring to FIG. 4, it can be appreciated that the articulating portion of the assembly is repositioned with respect to the base tire iron 96 where the articulating portion operates in one form as a first-degree lever where pressure can be applied at point 154 shown in FIG. 4a. This is accomplished by applying force along the line of force vector 28. Further, because the driving member 24 generally follows a circular motion about the pivot location 64, the longitudinal location of the pin 60 varies with respect to the degree of rotation. Therefore, in one form, the plunger adjustment system is comprised of a transverse pivot pin 60 which also allows the vertical adjustment of the plunger by way of the holes 54.

As is detailed in FIG. 9, the plunger 50 has a welded or formed tab 56 which is shaped and formed to minimize damage to the side wall of the tire 3. The tab 56 is shaped such that when pressure is applied to the leverage arm, the plunger is forced against the tire 3 forcing it away from the rim 4. This is accomplished in two directions such that the tab 56 moves away from the rim 4 which will assist in keeping the tab 56 from damaging the rim 4 while it is simultaneously pressing the tire down and away from the rim. Such damage is very undesirable as it could cause the tire to fail in its operation of maintaining air within.

The assembly 20 is configured to be capable of disassembling into component parts which can then be carried easily by a motorcycle driver. The components of the bead breaker assembly could include a group of tire irons usually combination of three tire irons. The three tire irons each have a first end, a second end, and a middle portion. A driving member is also disclosed having a central chamber region, a first end, a middle portion, and a second end. Transverse holes are disposed in the first end, middle portion and the second end and configured to accept a pin. The first end of the driving member is configured to accept the end portion of the leverage tire iron in such a way as to form an extension of the driving member. In one form, a pin is then passed through the transverse holes of the driving member and the leverage tire iron fixing it in place. Similar attachment methods can be utilized, such as a press-fit, magnetic coupling, ball and socket, and the like. A plunger member is also disclosed having a first end, a middle portion, and a second end. A plurality of transverse holes are provided in the middle section of the plunger member and configured to accept a pin. The holes in the middle portion of the plunger member are configured to align with transverse holes in the middle portion of the driving member thus forming a pivot point. A tab portion is also disposed on the second end of the plunger member and configured to engage the tire portion of a tire/wheel assembly.

The second end of the driving member is configured with a plurality of transverse holes configured to accept a pin. Transverse holes in the second end of the driving member are configured to accept the pin which is also passed through transverse holes in the second end of the support tire iron forming a pivot point such that the driving member which is coupled to the leverage tire iron pivots about the pin in the support tire iron. A base elbow is also disclosed having a first end, a second end, and a middle or angled portion. The base elbow also comprises a substantially channel portion configured to accept the second end of the support tire iron. A pin is then positioned through holes in the second end of the support tire iron and the first end of the base elbow which prohibits vertical movement of the support tire iron in relation to the base elbow. The channel is configured in such a way that the support tire iron is prohibited from rotating about the pin. The angled portion form substantially a 90° angle between the first end of the base elbow and the second end of the base elbow. The second end of the base elbow is configured to accept the end portion of the base tire iron and fix it in place as described with the support tire iron. It may be desired that each of the pins previously discussed are in the form of quick release pins which are common in the art.

As force applied to the leverage tire iron once the apparatus is assembled and in place may cause outward force from the base elbow, a lock bar is also disclosed configured to fixedly in positionably to engage the base tire iron. As such it can be slid up against the tire and forms a cam-like positioning member. This lock bar prohibits movement of the tire/wheel assembly outward away from the base elbow.

Also disclosed is a kit containing all of the elements previously discussed and many others which can be used to aid in repair or removal of a tire from a motorcycle in the field. Such a kit could contain the plurality of tire irons, the quick release pins, the plunger member, the base elbow, the driving member, a fluid such as bead goop (tm), a plurality of scratch guards. In addition a base member may also be provided which is configured to support the assembly while it is being assembled and while it is in use. Further included in the kit may be a valve stem multi-tool which is configured to remove the valve stem from the wheel and thus release air pressure therefrom. The valve stem multi-tool may have several different tools disposed thereon including a tool for releasing pressure from a tire, a tool to remove the valve stem from the tire, and a tool for reinserting a new valve stem then into the wheel or tire. A plurality of rim protectors may also be included in this kit as will be described later. As many as these parts are relatively small it may be desired to couple a plurality of these elements together by way of a lanyard. For example it may be beneficial to couple several of the pins together which enlarges their total size and aids in keeping them from being lost. It may optionally be desired to connect scratch guards by way of a lanyard to maintain their position on the base elbow and to keep them from getting misplaced. The tire iron 144 which in its independent forms may be the leverage tire iron 22, the support tire iron 26, or the base tire iron 96. It may be identical in size and shape, but a variety of length may be selected at the option of the user. The tire iron 144 is constructed of a metal bar or other suitable material size as desired for use, but for this working model approximately point 25 inches thick, point 75 inches wide, and eight inches long. The first end 32 and second end 34 are tapered and formed as needed to facilitate the process of prying the rubber tire from the metal rim. Usually the first end 32 of the tire iron 144 will comprise a spoon-like bend, which is proven to assist in the tire removal process, and the second end 34 will be tapered and flattened.

Additionally, each tire iron 144 has a hole of sufficient size drilled or machined through the flat portion of each end, positioned and sized as required to provide for insertion of removable fixing pin as previously discussed. In one form, these holes are approximately 1 inch to 1.5 inches from the ends.

To assemble the assembly 20 in one form, a tire iron 144 is positioned into each end of the base elbow 28, and a pin is placed in a hole selected by the user, so the end of each tire iron 144 is fixed within the ends of the base elbow. The base elbow is placed on a flat horizontal surface, preferably the ground or a workbench, with one tire iron 144 directed vertically upward, and one tire iron 144 resting on the work surface. The tire 3 and rim 4 assembly is placed down over the vertical tire iron so that the vertical tire iron penetrates the space between the spokes, in the open area between the metal rim 4 and the axial hob 8. The tire and rim assembly will rest horizontally on the work surface. The base tire iron 96 should project outward from the hub 8 and should pass underneath the rim 4 and tire 3. The weight of the rim 4 and tire 3 assembly will rest upon the base elbow 28. The tire assembly and base elbow can be adjusted so that the support tire iron 26 is in close proximity to the inner edge of the rim 4. A leverage tire iron 22 is inserted into the channel 36 of the driving member 24 so that the leverage tire iron 22 becomes an extension of the driving member 44. A removable pin 38 is inserted as selected by the user, fixing the leverage tire iron in place within the channel 36 of the driving number 24. The driving member 24 is held in a substantially horizontal position and the first end 52 of the plunger 50 is inserted upwardly into the channel 36 of the driving member 24. The user selects an appropriate hole 54 and hole 48, and inserts a pin 60 into the driving member 24 passing the pin through a hole 54 of the plunger 50. This connection becomes a hinging point for the plunger 50 in relation to the driving member 24. The tab 56 at the opposite end of the plunger 50 is pointing substantially downward.

The substantially parallel site extensions 158 and 160 of the driving member 24 are then positioned over the support tire iron 26 that is projection substantially vertically between the spokes of the tire assembly. A pin 66 is positioned through the holes 62 and 64 of these side extensions 160 and 158, and simultaneously through the hole at the end of the end of the support tire iron 26. The assembly of the bead braking device in one form is now complete.

The user can then adjust the various components relative to one another, such that each component achieves the best leverage and in addition the wedge-shaped tab 56 of the plunger 50 makes contact with the pneumatic tire, at the point 154 where the tire and rim meet. Once all adjustments are complete, the user may exert force upon the leverage tire iron 22 along force vector 28 thus compressing the tire 3. Due to the particular configuration of the plunger and tab 56, it will also tend to move the plunger 50 inward away from the rim 4 which is desirable for the purpose of breaking the bead. The more force the user exerts upon the leverage tire iron 22, the more the side wall and bead are pushed downward and out of contact with the metal rim 4. At some point the "bead will break" meaning that the adhesive or friction seal between the tire 3 and rim 4 will give way. The user can then reposition the assembly 20 to an adjacent position and repeat the process as needed until the entire side wall has broken contact from the rim. The user can then turn the entire assembly over, and repeat the bead breaking process on the other side of the tire assembly. Once the tire bead has been broken from both sides of the tire assembly, the rubber tire 3 and inner tube (if present) can be removed for repair or replacement. The user may then remove the appropriate pins from the assembly, freeing the assembly from its role and structural members of the bead breaking device releasing the tire irons 144. The user may then employ the tire irons 144 as needed in the process of removing the tire 3 from the rim 4. If the assembly is used in field conditions where a relatively hard work surface is not available, the assembly may be positioned on two or more plywood, wooden, or metal slats. One form of these slats is the foot 112.

Once the tire 3 has been removed from the rim 4, it is usually a simple matter to repair or replace the tire 3 and then reposition the repaired tire 3 upon the rim 4 and re-inflate the tire 3 to correct the damage that was initially caused. The wheel assembly may then be replaced on the motorcycle or vehicle and the user can go on their way.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A method for breaking a circumferential bead of a tire from an associated rim and for removing said tire from said rim comprising:
   providing a bead breaker assembly comprising:
      a group of tire irons, a driving member, a plunger member, and a base elbow;
      the group of tire irons including a leverage tire iron comprising an end portion, a support tire iron comprising a first end and a second end, a base tire iron comprising an end portion,
      the driving member comprising a first end, a middle portion, and a second end, the first end of the driving member removably coupled to the end portion of the leverage tire iron,
      the plunger member having a middle section wherein the middle section is removably, and rotatably coupled to the middle portion of the driving member,
      the base elbow having a first end, a second end, wherein the first end is positionably coupled to the second end of the support tire iron, and wherein the second end is removably coupled to the end portion of the base tire iron,
   engaging said bead breaker assembly with said tire and rim and applying sufficient force against the tire immediately adjacent the rim via said plunger member to break the bead; and
   disassembling the group of tire irons from the bead breaker assembly and utilizing said tire irons to separate the tire from the rim.

2. The method of claim 1 further comprising the step of:
   coupling a foot member to the base tire iron, the foot member configured to increase the stability of the apparatus while in use.

3. The method of claim 1 wherein said tire irons of the group of tire irons are interchangeable.

4. The method of claim 3 wherein said tire irons are substantially identical.

5. The method of claim 1 further comprising the step of:
   providing a plurality of malleable scratch guards operatively configured to be positioned between the base elbow and the rim.

6. The method of claim 1 further comprising the step of:
   providing a plurality of rim protectors operatively configured to the inside diameter of the tire to protect the tire from the tire irons.

7. The method of claim 1 further comprising the step of:
   fixedly and positionably coupling a stop member to the base tire iron wherein the stop member maintains the position of the tire and the rim in relation to the base elbow.

* * * * *